United States Patent [19]

Suzuki et al.

[11] Patent Number: 5,739,614
[45] Date of Patent: Apr. 14, 1998

[54] TWO-PHASE UNIPOLAR DRIVING BRUSHLESS DC MOTOR

[75] Inventors: Yuzuru Suzuki; Sakae Fujitani; Kenichi Makino, all of Asabo-cho, Japan

[73] Assignee: Minebea Co., Ltd., Nagano-ken, Japan

[21] Appl. No.: 814,251

[22] Filed: Mar. 11, 1997

[30] Foreign Application Priority Data

Apr. 25, 1996 [JP] Japan ................... 8-127639

[51] Int. Cl.⁶ ............................. H02K 23/24; H02K 1/10
[52] U.S. Cl. .............. 310/180; 310/67 R; 310/68 B; 310/182; 310/185; 310/186; 310/254
[58] Field of Search .................. 310/68 B, 67 R, 310/180, 182, 185, 186, 254, 256, 259

[56] References Cited

U.S. PATENT DOCUMENTS

| | | | |
|---|---|---|---|
| 3,299,335 | 1/1967 | Wessels | 318/138 |
| 3,310,696 | 3/1967 | Davin | 310/164 |
| 4,140,935 | 2/1979 | Braun et al. | 310/234 |
| 4,535,261 | 8/1985 | Tsukamoto et al. | 310/78 |
| 4,616,150 | 10/1986 | Concannon | 310/177 |
| 4,775,813 | 10/1988 | Janson | 310/257 |
| 5,418,816 | 5/1995 | Muller | 310/186 |

FOREIGN PATENT DOCUMENTS

| | | |
|---|---|---|
| 0752749 | 1/1997 | European Pat. Off. |
| 01283036A | 11/1989 | Japan |
| 1-318536 | 12/1989 | Japan |

OTHER PUBLICATIONS

Patent Abstracts of Japan, vol. 011, No. 161 (E–509), May 23, 1987 & JP 61 293148 A (Tokyo Electric Co., Ltd.), Dec. 23, 1986.
Patent Abstracts of Japan, vol. 012, No. 447 (E–685), Nov. 24, 1988 & JP 63 174537 A (Sankyo Seiki Mfg. Co. Ltd) Jul. 19, 1988.

*Primary Examiner*—Thomas M. Dougherty
*Assistant Examiner*—Tran Ngoc Nguyen
*Attorney, Agent, or Firm*—Frishauf, Holtz, Goodman, Langer & Chick

[57] ABSTRACT

A two-phase unipolar driving brushless DC motor of a radial gap type having a rotor position detector includes a main-pole yoke having main-poles, an interpole yoke coaxially provided with the main-pole yoke in a superposed manner and having interpoles and an axial short-circuit portion or member provided in an axially extending portion in magnetic fluxes formed in the main-poles and interpoles. This structure allows for easy winding of coils around the main-poles and enhanced winding space factor in order to increase the starting torque and to improve the motor efficiency.

6 Claims, 6 Drawing Sheets

TWO-PHASE UNIPOLAR DRIVING BRUSHLESS DC MOTOR

BACKGROUND OF THE INVENTION

1. Field of the Invention

The present invention relates to a two-phase unipolar driving brushless DC motor of a radial gap type having a rotor position detector and more particularly to a two-phase unipolar driving brushless DC motor having a magnet circuit formed by main-poles, interpoles and an axial short-circuit portion.

2. Description of the Related Art

As disclosed in U.S. Pat. No. 3,299,335 or Japanese Unexamined Patent Application Publication No. 1-318536, the conventional two-phase unipolar driving brushless DC motor which is controlled by a rotor position detector has interpoles provided on a stator and non-magnetized portions or grooves formed in a rotor magnet, and the stabilization of starting torque including the removal of dead points is achieved by adjusting the magnetic flux distribution in air gaps. Since, however, this motor cannot provide large stable starting torque, it is merely used as a fan motor or the like which provides small torque.

As disclosed in the above-mentioned United States patent, the conventional two-phase unipolar driving brushless DC motor requires interpoles provided on the stator and unitarily formed with the main-poles in a plane in order to produce stable starting torque. More specifically, the stator of the motor is formed by laminating axially the punched-out plate pieces comprising main-pole portions and interpole portions arranged alternately in the circumferential direction in a horizontal plane.

The conventional two-phase unipolar driving brushless DC motor has a problem that winding operation is difficult because the conventional interpoles occupy a large space. Further, this conventional motor has a severe problem that the winding space factor cannot be elevated since the space occupied by the windings is reduced owing to the existence of the interpoles.

In particular, when the conventional motor of this type has a large pole number of the rotor magnet, these problems cause seriously adverse effects. The existence of the interpoles hinders the effective formation of the coils wound around the main-poles and thus large magnetic force cannot be obtained. As a result, the conventional motor cannot produce large starting torque and has a poor motor efficiency, causing a problem for an actual use.

SUMMARY OF THE INVENTION

The object of the present invention is to provide a two-phase unipolar driving brushless DC motor of a radial gap type which has an absolute advantage in the cost and in which winding operation can be performed with ease and the winding space factor can be elevated, resulting in increased starting torque and the improved motor efficiency.

A two-phase unipolar driving brushless DC motor of a radial gap type having a rotor position detector according to the present invention comprises a main-pole yoke having an axis and main-poles around which coils are wound and are arranged circumferentially of the main-pole yoke, an interpole yoke provided coaxially with the main-pole yoke in a superposed manner and having interpoles which are arranged circumferentially of the interpole yoke, a rotor assembly disposed coaxially with the main-pole yoke and the interpole yoke and provided with a rotor magnet having the same number of poles as the main-poles, magnetic flux circuits formed in the main-poles, for forming circulating magnetic fluxes in the main-poles and the interpoles, an axial magnetic short-circuit portion provided in a vicinity of and around the axis of the main-pole yoke and at and between the main-pole yoke and the interpole yoke, for guiding a part of the magnetic flux along the axis of the main-pole yoke, and a rotor position detector disposed at the rotor assembly and provided immovably with respect to the stator assembly.

This structure of the motor provides the following technical effects:

1. Since the main-poles and interpoles of the stator portion are separate parts, the winding operation on the main-poles can be performed before the interpoles are attached to the main-poles, thereby elevating the winding space factor; and 2. Since provision of the axial short-circuit portion between the main-poles and interpoles coaxially disposed in a superposed manner allows the main-poles and interpoles to be magnetically connected in the axial direction of the motor, the same magnetic effect as that provided by the conventional unitary arrangement of the main-poles and the interpoles in the same plane can be attained even if the pole number of the rotor magnet poles is increased.

DETAILED DESCRIPTION OF THE PREFERRED EMBODIMENTS

The present invention will be described in detail by way of the preferred embodiments with reference to the accompanying drawings.

Figure 1:
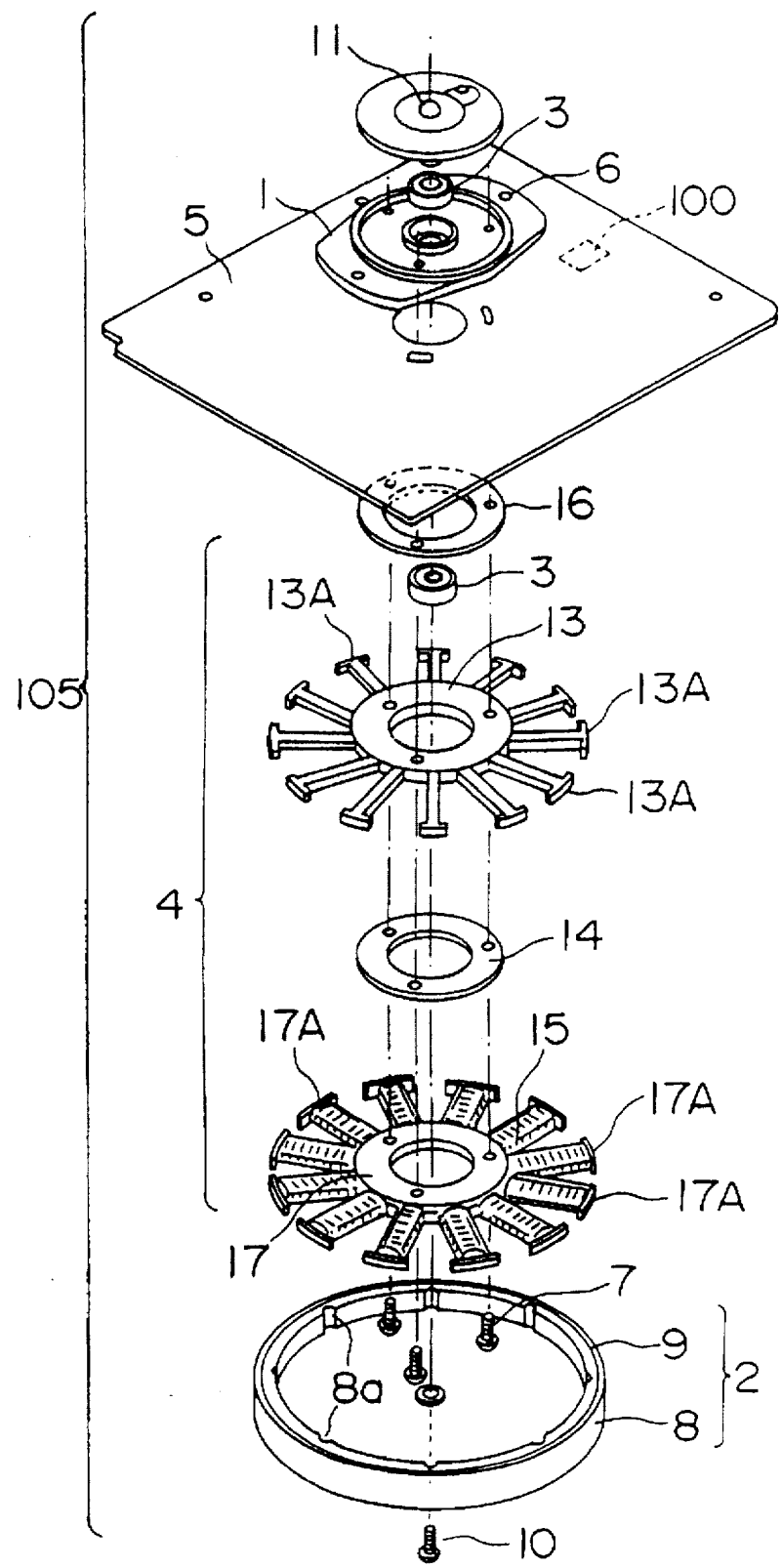
FIG. 1 is an exploded perspective view of an embodiment a two-phase unipolar driving brushless DC motor according to the present invention.

FIG. 1 is an exploded perspective view of a two-phase unipolar driving brushless DC motor of a radial gap type which is of a flat outer rotor type and is used as a spindle motor and which is applied to the present invention. The rotor magnet of the motor has twelve poles. A housing 1 is cut-formed from aluminum material. Two ball bearings 3 for rotatably supporting a rotor assembly 2 are received in holes formed in the upper and lower surfaces of the housing 1, and a stator assembly 4 (shown in an exploded state) and a driving circuit board 5 which is also used as a motor attaching plate are fixed to the housing 1. In the housing 1 are formed fixing holes 6 for fixing a motor composition 105 formed by assembling parts shown in an exploded state in FIG. 1.

The driving circuit board 5 is formed from a ferromagnetic iron plate and a printed circuit is formed thereon. The circuit contains an integrated circuit required for driving the two-phase unipolar brushless DC motor, and electric parts such as a rotor position detector 100, resistors, capacitors and other necessary electric elements.

Figure 2:
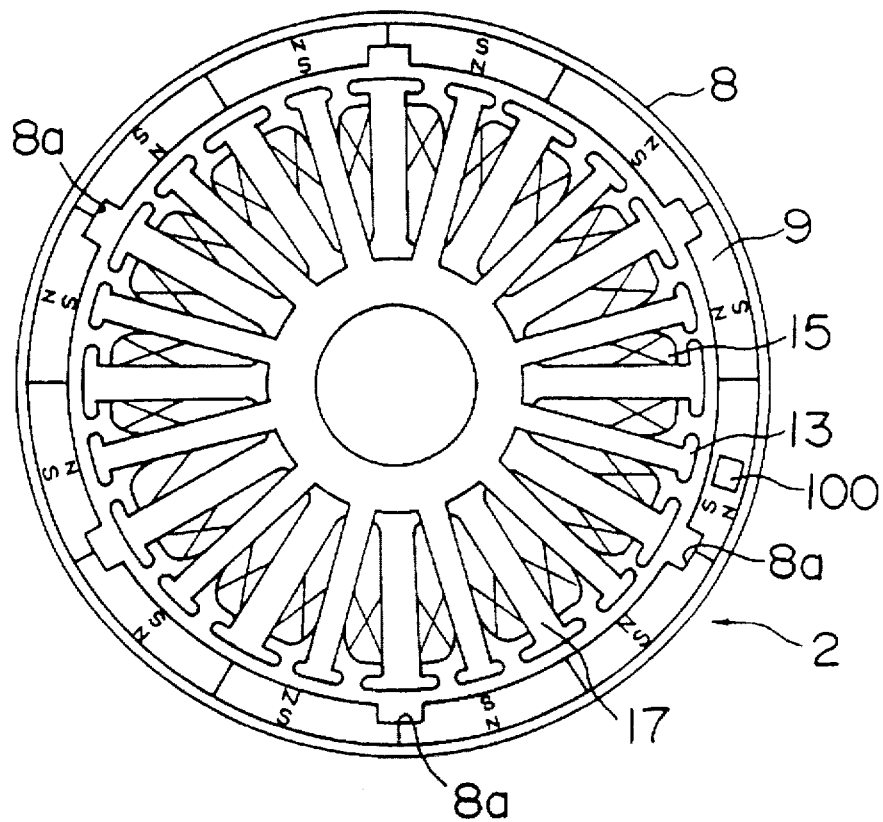
FIG. 2 is a plan view of the assembled motor composition of the motor of FIG. 1.

The stator assembly 4 comprises a spacer 16, an interpole yoke 13, a ring-shaped magnetic short-circuit member 14 (an embodiment of axial magnetic short-circuit means) and a main-pole yoke 17. The interpole yoke 13 comprises a ring-shaped central portion and twelve interpoles 13A extending radially outward therefrom. Similarly, the main-pole yoke 17 comprises a ring-shaped portion and twelve main-poles 17A extending radially outward therefrom. The interpole yoke 13 and the main-pole yoke 17 are constituted by several press-formed electromagnetic steel plates (two plates for the interpole yoke and three plates for the main-pole yoke) which are axially laminated and connected together, with the necessary portions of the main-pole yoke being insulated thereafter, and coils 15 wound around the main-pole yoke 17. As shown in FIG. 2, it is preferred that the interpoles 13A and the main-poles 17A be circumferentially alternately arranged at equal intervals. Three screws 7 are used for fixing the driving circuit board 5 and the stator yoke assembly 4 to the housing 1.

The rotor assembly 2 comprises a rotor yoke 8 and a rotor magnet 9 fixed to the inner peripheral surface of the rotor yoke 8, and the assembly 2 is fixed to a shaft 11 by means of a set screw 10 extending through the stator assembly 4, the driving circuit board 5 and the housing 1. In this way, the rotor assembly 2 and the shaft 11 are integrally assembled together. The rotor assembly 2 is rotatably supported on the housing 1 by means of the ball bearings 3.

As disclosed in U.S. Pat. No. 3,299,335 and Japanese Unexamined Patent Application Publication No. 1-318536, it is preferred that a half number of non-magnetized portions or magnetic grooves whose number is a half of the number of the main-poles be formed on or in the rotor magnet 9 in order to stabilize the starting torque. In this embodiment, six grooves 8a are formed.

The motor operates in the same way as the conventional two-phase unipolar driving motor with a rotor position detector, the detailed description thereof being omitted.

FIG. 2 is a plan view of an assembled motor composition 105 (the shaft 11 and the bearing portion being omitted) of this embodiment. This figure shows the circumferential positional relationships between the main-pole yoke 17 around which coils are wound, the unwound interpole yoke 13 and the grooves 8a and the rotor magnet 9 in a magnetized state.

Figure 3:
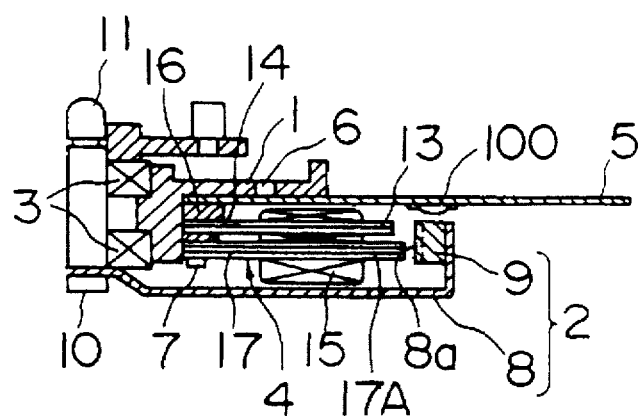
FIG. 3 is a vertical cross-sectional view of the motor of FIG. 2.

FIG. 3 is a vertical cross-sectional view of the motor composition 105 of this embodiment, in which there is shown the axial relationship between the main-pole yoke 17, the interpole yoke 13, axial magnetic short-circuit members 14 constituting the magnetic short-circuit portions and the rotor magnet 9. The motor composition 105 contains the coils 15, the rotor position detector 100 (a Hall sensor which is mounted on the driving circuit board 5 in this embodiment), and the other elements being designated by the same reference numerals as those in the motor in FIG. 1.

Figure 4:
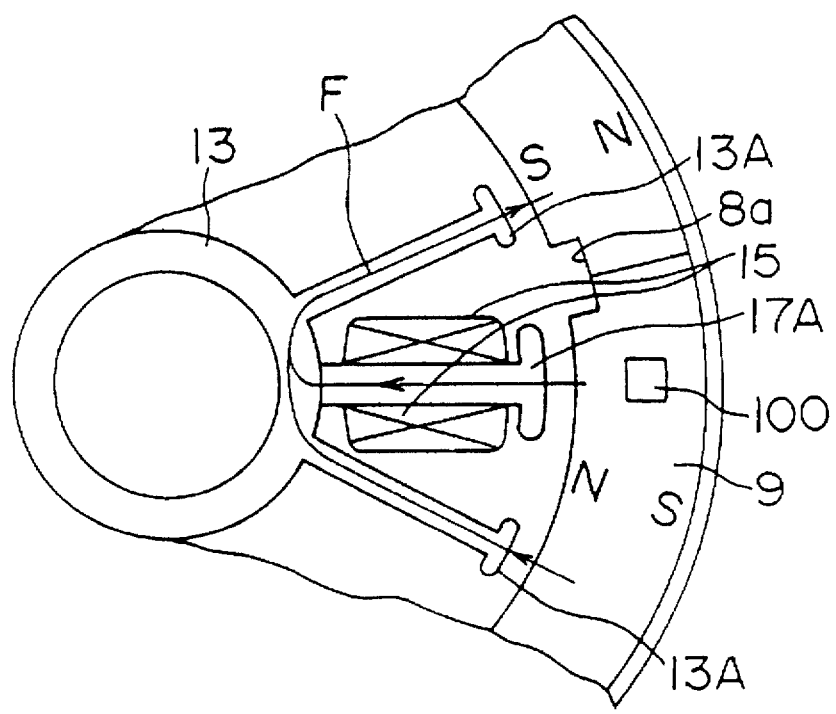
FIG. 4 is a plan view of a part of the stator assembly of a first embodiment of the motor according to the present invention.
Figure 5:
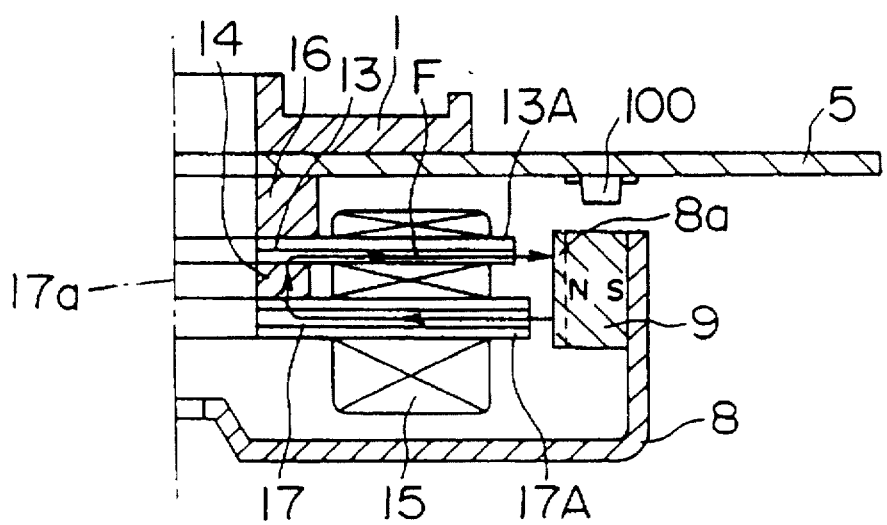
FIG. 5 is a vertical cross-sectional view of FIG. 4.

FIGS. 4 and 5 show a first embodiment of a magnetic circuit which is shown in a form of a magnetic flus F and which has a specific feature of the present invention. The magnetic circuit comprises magnetic paths formed in the interpole 13A at both sides of each main-pole 17A, a magnetic path formed in the main-pole 17A and a magnetic path formed in the magnetic short-circuit member 14 provided between the main-pole and interpole yokes 17 and 13. Magnetic fluxes F pass horizontally from the N pole of the rotor magnet 9 to the central portion of the interpole yoke 13 through one of the two interpoles 13A at both sides of each main-pole 17A, on one hand, and the main-pole 13, on the other hand, as shown by arrows in FIGS. 4 and 5.

The magnetic flux F passing through said one of the interpoles 13A changes its direction so as to be directed circumferentially to the inner ends of the other interpole 13A in the central portion of the interpole yoke 13. The magnetic flux F passing through the main-pole 17A changes its direction so as to be directed slantwise but substantially axially to the inner end of the other interpole yoke 13 in the magnetic short-circuit member 14 which extends along the axis 17a of the main-pole yoke 17. The member 14 is an example of magnetic short-circuit means which forms an axially extending magnetic short-circuit portion extending along the axis 17a of the main-pole yoke 17. Then, the flux F is again directed horizontally in the interpoles 13A and enters the S pole of the rotor magnet 9. In this way, a magnetic circuit is formed. What is important here is that the magnetic flux F has a large axial component as well as a circumferential component in the magnetic short-circuit member 14. In other words, the magnetic short-circuit member 14 constitutes an axially extending magnetic short-circuit portion or axial magnetic short-circuit means extending along the axis 17a of the main-pole yoke 17.

Since the main-pole yoke 17 and the interpole yoke 13 are manufactured separately and assembled together by superposing one on the other with the magnetic short-circuit member 14 interposed therebetween, coils can be wound on the main-poles 17A at an ample winding space factor before attaching the interpole yoke 13 to the main-pole yoke 17, and a high magnetomotive force which could not be obtained from the conventional motor is maintained. In other words, the problem on the magnetic circuit in which a high magnetomotive force could not be obtained with the conventional motor has been solved by effecting a secure axial magnetic connection between the main-pole yoke 17 and the interpole yoke 13 by means of the magnetic short-circuit member 14.

Figure 6:
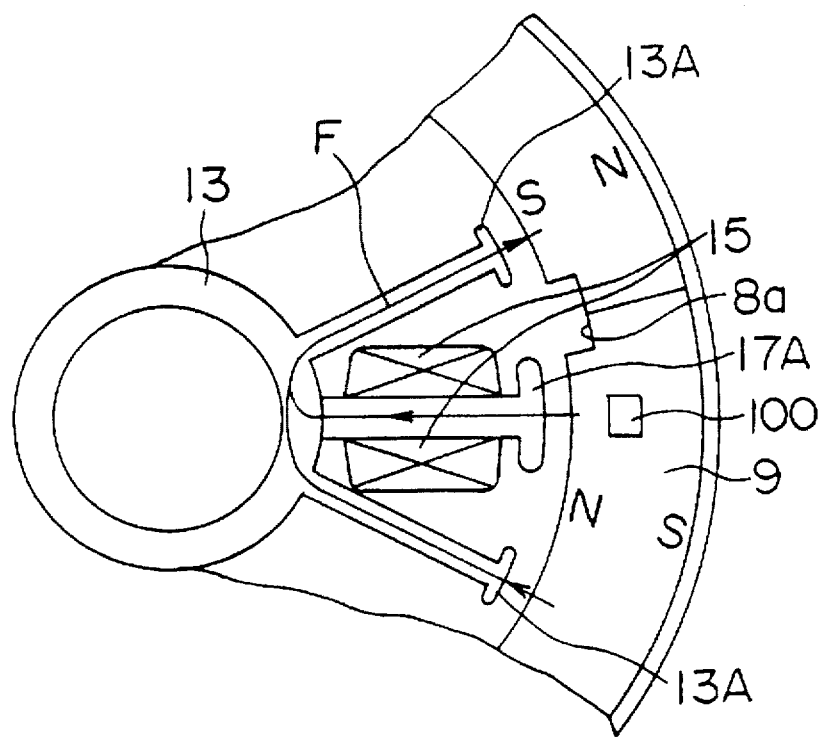
FIG. 6 is a plan view of a part of the stator assembly of a second embodiment of the motor according to the present invention.
Figure 7:
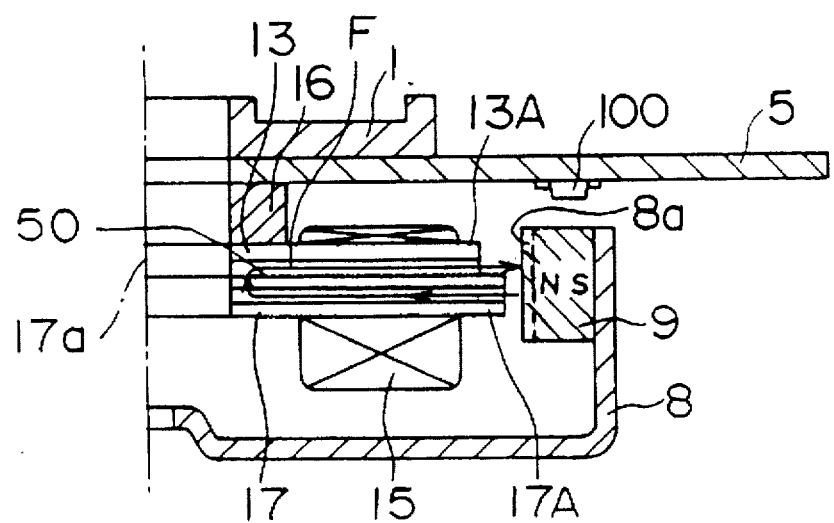
FIG. 7 is a vertical cross-sectional view of FIG. 6.

FIGS. 6 and 7 show a second embodiment of a magnetic circuit which has a specific feature of the present invention. As shown by arrows in these figures, the formation and directions of the circuit of the magnetic fluxes F which define magnetic circuits are similar to those of the magnetic fluxes of the first embodiment as shown in FIGS. 4 and 5, with only one exception that there is no magnetic short-circuit member 14 of the first embodiment.

The specific feature of the second embodiment resides in that the ring-shaped central portions of the main-pole yoke 17 and the interpole yoke 13 from which the main-poles 17A and the interpoles 13A extend radially have substantially the same diameter. Thus, the main-pole yoke 17 and the interpole yoke 13 are magnetically connected together not only circumferentially but also axially at the ring-shaped central portions by merely superposing one on the other, as shown in FIG. 7. In other words, an axial magnetic path is formed without using a specific magnetic short-circuit member 14 as shown in the second embodiment. This allows the axial dimension of the motor composition 105 (i.e., the thickness of the motor) to be shortened, making the motor thin. In this case, however, it can be said that the central portions of the main-pole yoke 17 and the interpole yoke 13 which yokes contact each other form contact portions 50, and the contact portions 50 and the portions of the corresponding main-poles 17A and the interpoles 13A constitute axially extending short-circuit means of an axially extending short-circuit portion extending along the axis 17a of the main-pole yoke 17.

Figure 8:
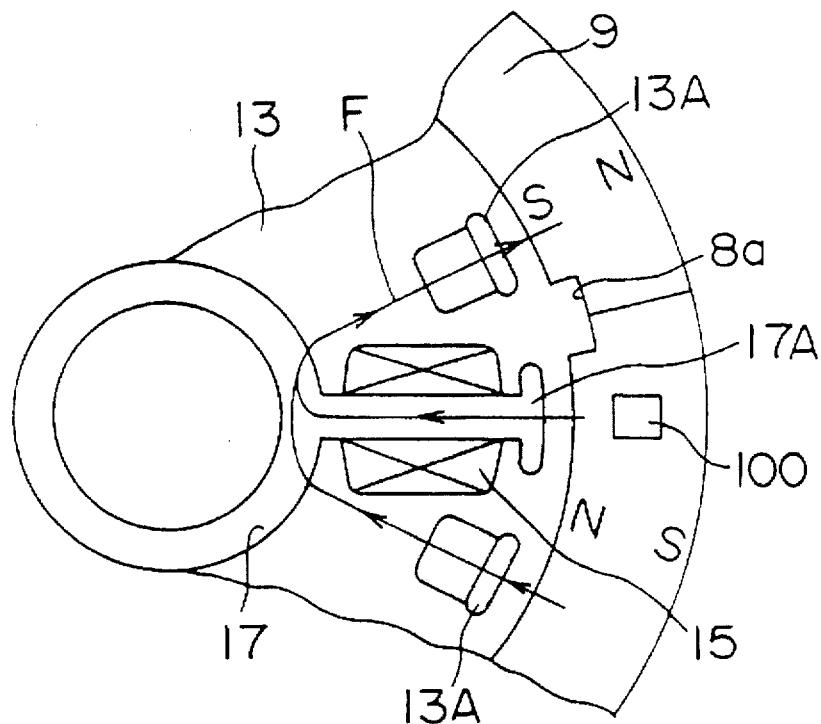
FIG. 8 is a plan view of a part of the stator assembly of a third embodiment of the motor according to the present invention.
Figure 9:
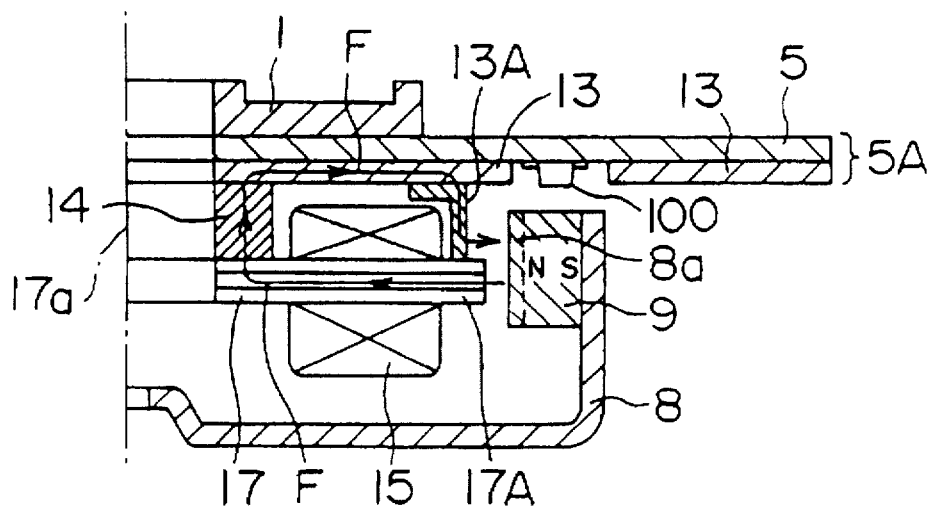
FIG. 9 is a vertical cross-sectional view of FIG. 8.

FIGS. 8 and 9 show a third embodiment of a magnetic circuit which is shown as a magnetic flux F and which has the specific feature of the present invention. In this embodiment, an interpole yoke 13 is formed by a ferromagnetic disc member, and a plurality of interpoles 13A (twelve main-poles as the same number of the main-poles in this embodiment) made of ferromagnetic material and separately manufactured from the interpole yoke 13 are fixed to the interpole yoke 13 in such a manner that the interpoles 13A are suspended from the interpole yoke 13. A magnetic short-circuit member 14 is provided between the main-pole and interpole yokes 17 and 13, for magnetically connecting them together in an axial direction.

In this arrangement, a magnetic flux F axially passes one of the interpoles 13A at both sides of each main-pole 17A and then horizontally passes the interpole yoke 13 from the N pole of the rotor magnet 9 to the central portion of the interpole yoke 13.

The magnetic flux F changes its direction so as to be directed circumferentially to the inner end of the other interpole 13A in the central portion of the interpole yoke 13. Another magnetic flux F horizontally extends through the main-pole 17A from the N pole of the rotor magnet 9 to the central portion of the main-pole yoke 17 and is directed slantwise but substantially axially upward to the inner end of the other interpole 13A in the magnetic short-circuit member 14.

The magnetic fluxes F horizontally outward pass the interpole yoke 13. Then, they axially downward pass the other magnetic pole 13A and finally enter the S pole of the rotor magnet 9. In this way, a magnetic circuit is formed. In this case, the magnetic short-circuit member 14 constitutes axial magnetic short-circuit means which forms an axially extending short-circuit means or an axially extending short-circuit portion extending along the axis 17a of the main-pole yoke 17.

Since the interpole yoke 13 is mechanically connected to the driving circuit board 5 by means of rivets or the like in the third embodiment, the mechanical rigidity of the driving circuit board 5 can be raised. This provides an advantage that the driving circuit board 5 can be manufactured from an inexpensive resin substrate which is used ordinarily. In this embodiment, the interpole yoke 13 does not have the portions of the pole yokes 13 extending radially. Thus, the winding space factor is much more increased. Here, the driving circuit board 5 and the interpole yoke 13 mechanically connected thereto also constitute a motor attaching plate 5A. In this case, the interpole yoke 13 and the interpoles 13A may be formed integral with each other by pressing operation or the like.

Figure 10:
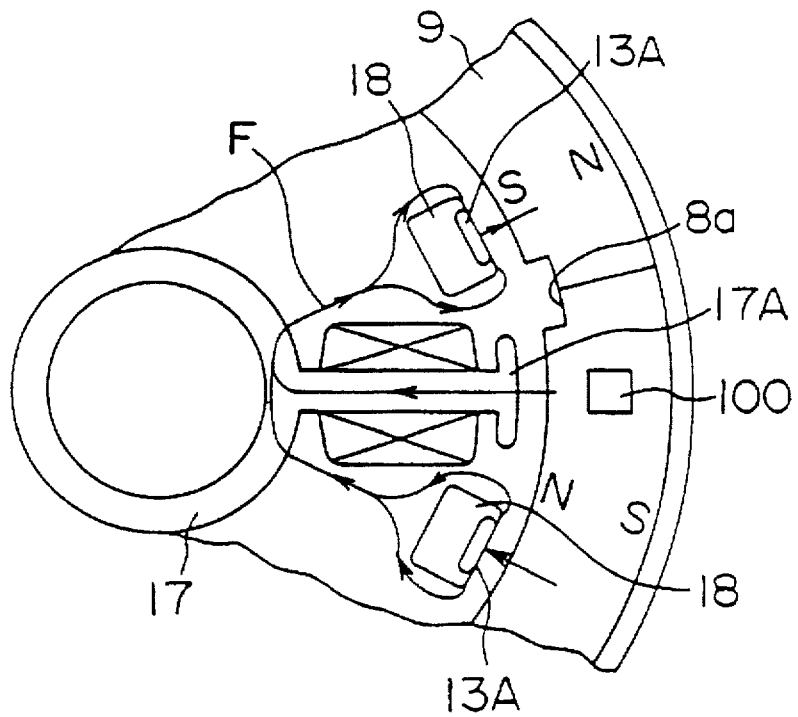
FIG. 10 is a plan view of a part of the stator assembly of a fourth embodiment of the motor according to the present invention.
Figure 11:
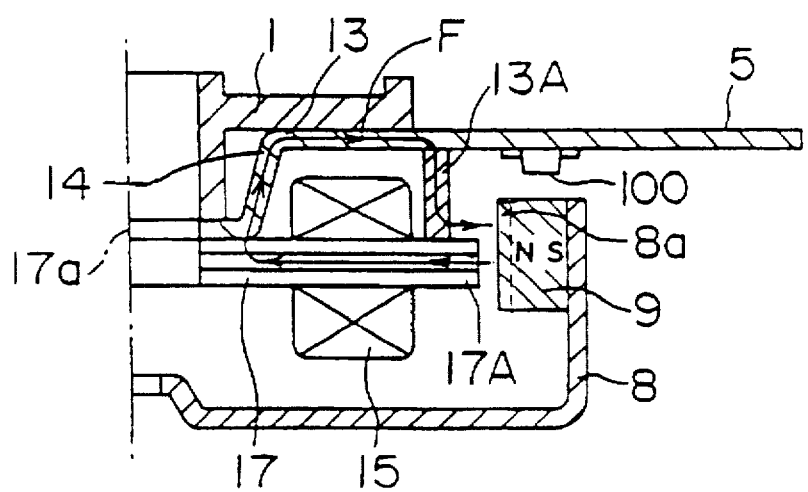
FIG. 11 is a vertical cross-sectional view of FIG. 10.

FIGS. 10 and 11 show a fourth embodiment of a magnetic circuit which is shown by a magnetic flux F and which has a specific feature of the present invention. This embodiment differs from the third embodiment in that a magnetic short-circuit portion 14, an interpole yoke 13 and interpoles 13A are formed in a driving circuit board 5 made of a ferromagnetic material. In this embodiment, the magnetic short-circuit portion 14 constitutes axial magnetic short-circuit means which forms an axially extending portion extending along the axis 17a of the main-pole yoke 17.

The feature of the fourth embodiment resides in that the driving circuit board 5 is formed from an highly rigid iron plate made of a ferromagnetic material, and an annular magnetic short-circuit portion 14, an annular interpole yoke 13, and interpoles 13A are simultaneously press-formed in the driving circuit board 5.

The magnetic short-circuit portion 14 which is an example of magnetic short-circuit means is formed into a cylindrical shape by pressing the circular portion of the driving circuit board 5 downward. The circumferentially spaced rectangular portions around the portion are punched out from the driving circuit board 5 and bent downward at right angles to form the interpoles 13A.

The circuit of magnetic fluxes F of this embodiment is similar to that of the third embodiment. As shown by arrows in FIGS. 10 and 11, one of the magnetic fluxes F passes a main-pole 17A and a main-pole yoke 17 horizontally from the N pole of the rotor magnet 9 to the central portion of the main-pole yoke 17. Another magnetic flux F enters one of the vertical interpoles 13A at both sides of the main-pole 17A from the N pole of the rotor magnet 9 and directed axially upward and passes the interpole yoke 13 horizontally radially inward. Then, the flux F extends downward in the magnetic short-circuit portion 14.

Thereafter, the magnetic fluxes F are directed upward in the magnetic short-circuit portion 14, horizontally radially outward in the interpole yoke 13 and downward in the other interpole yoke 13. Finally, the magnetic fluxes F enter the S pole of the rotor 9. Holes 18 are formed in the portions of the driving circuit board 5 which correspond to the punched-out interpoles 13A. Thus, the magnetic fluxes F make a detour as shown in FIG. 10. In this case, the While the interpoles 13A, the interpole yoke 13 and the magnetic short-circuit portion 14 are separately manufactured in the third embodiment, they are formed integral by punching them out from the driving circuit board 5, i.e., from one piece. This enables the motor to be made thin and can reduce the cost greatly.

The first to fourth embodiments have been described as flat outer rotor type brushless DC motors. However, the present invention is not limited to the brushless motor of a flat outer rotor type but it may be of a cylindrical inner type. Further, the number of poles of the rotor is not limited to twelve but may be any other suitable number. However, the more the pole, the more effective as described above.

The present invention provides a two-phase unipolar driving brushless DC motor which has a very large winding space factor. Thus, the starting torque is increased to enhance the motor efficiency. Further, the coils are wound around the main-poles easily, resulting in the reduction of the cost of the motor.

In these respects, the two-phase unipolar driving brushless DC motor according to the present invention can be used as a highly reliable spindle motor which can drive the memory medium of an information recording apparatus which requires a high starting torque or as a capstan motor for driving the tape of a recording tape apparatus.

What is claimed is:

1. A two-phase unipolar driving brushless DC motor including:

a stator assembly comprising a main-pole yoke having an axis and main-poles around which coils are wound and are arranged circumferentially of said main-pole yoke and an interpole yoke provided coaxially with said main-pole yoke in a superposed manner and having interpoles which are arranged circumferentially of said interpole yoke;

a rotor assembly disposed coaxially with said main-pole yoke and said interpole yoke and provided with a rotor magnet having the same number of poles as said main-poles;

magnetic flux circuits formed in said main-poles and said interpoles, for forming circulating magnetic fluxes in said main-poles and said interpoles;

axial magnetic short-circuit means provided in a vicinity of and around said axis of said main-pole yoke and at and between said main-pole yoke and said interpole yoke, for guiding a part of said magnetic flux along said axis of said main-pole yoke; and a rotor position detector disposed at said rotor assembly and provided immovably with respect to said stator assembly.

2. The motor according to claim 1, wherein said axial magnetic short-circuit means comprises axial magnetic short-circuit members extending along said axis of said main-pole yoke.

3. The motor according to claim 1, wherein said main-pole yoke and said interpole yoke have contact portions forming said axial magnetic short-circuit means.

4. The motor according to claim 1, wherein said interpole yoke having said interpoles comprises laminated plates made of a ferromagnetic material.

5. The motor according to claim 1, further comprising a motor driving circuit board made of a ferromagnetic material, and wherein said interpole yoke forms a part of said motor driving circuit board and said main-pole yoke is fixed to said interpole yoke.

6. The motor according to claim 5, wherein said interpole yoke includes said magnetic short-circuit means.

* * * * *